United States Patent [19]
Esmond

[11] 3,910,841
[45] Oct. 7, 1975

[54] STACKED EXCHANGE DEVICE

[76] Inventor: William G. Esmond, 537 Stamford Road, Baltimore, Md. 21229

[22] Filed: Apr. 2, 1974

[21] Appl. No.: 457,213

[52] U.S. Cl. .............................. 210/231; 210/321
[51] Int. Cl.$^2$ .................. B01D 25/12; B01D 31/00
[58] Field of Search ....... 210/22, 23, 253, 321, 493, 210/498, 227–231

[56] References Cited
UNITED STATES PATENTS

| | | | |
|---|---|---|---|
| 3,018,894 | 1/1962 | Brown | 210/231 |
| 3,289,845 | 12/1966 | Weber | 210/231 |
| 3,490,523 | 1/1970 | Esmond | 210/321 X |
| 3,497,065 | 2/1970 | Johnson, Jr. | 210/231 |
| 3,695,445 | 10/1972 | Esmond | 210/321 |
| 3,703,466 | 11/1972 | Laforest et al. | 210/321 |
| 3,723,305 | 3/1973 | Redford | 210/22 |
| 3,734,851 | 5/1973 | Matsumula | 210/22 |
| 3,823,827 | 7/1974 | Redford | 210/493 |

Primary Examiner—Theodore A. Granger
Attorney, Agent, or Firm—Diller, Brown, Ramik & Wight

[57] ABSTRACT

This disclosure relates to an exchange device, such as an artificial kidney, wherein a plurality of first plates and second plates are arranged in alternating stacked relation with there being positioned between the plates transfer films. A first of the plates has flow passages formed in opposite faces of central portions thereof, and the second plates being open in alignment with the central portions of the first plates, and the transfer films being arranged in pairs between each of the first plates and forming therebetween a plurality of flow passages as defined by the flow passages in the first plate for a fluid to be treated with a treating fluid flowing between the transfer films and an opposed face of an adjacent first plate in the flow passages formed therein.

18 Claims, 13 Drawing Figures

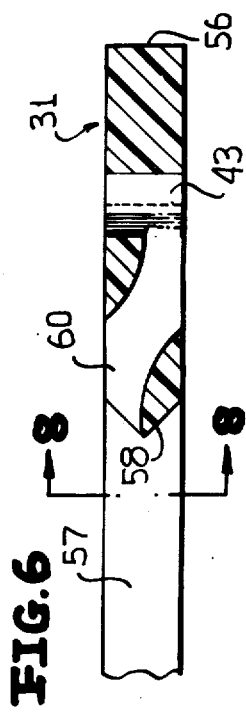
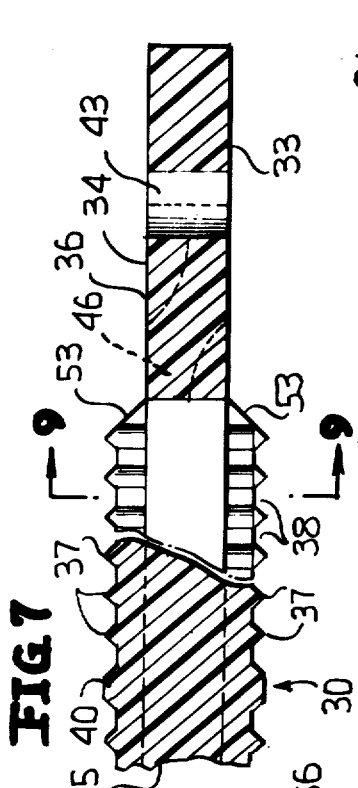
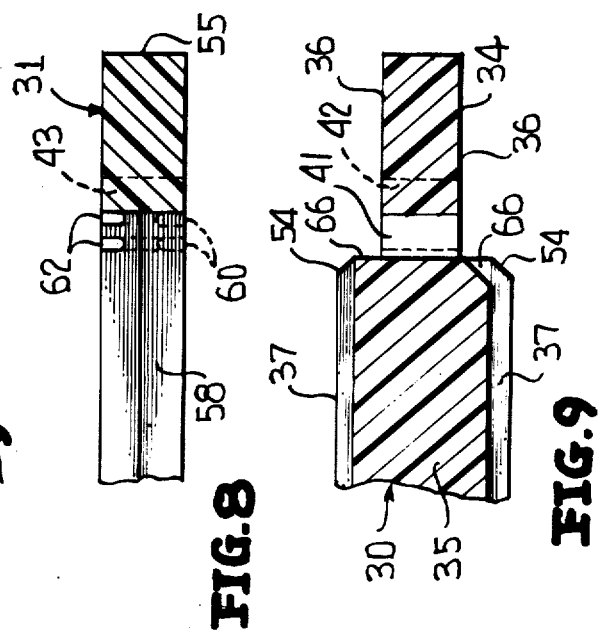
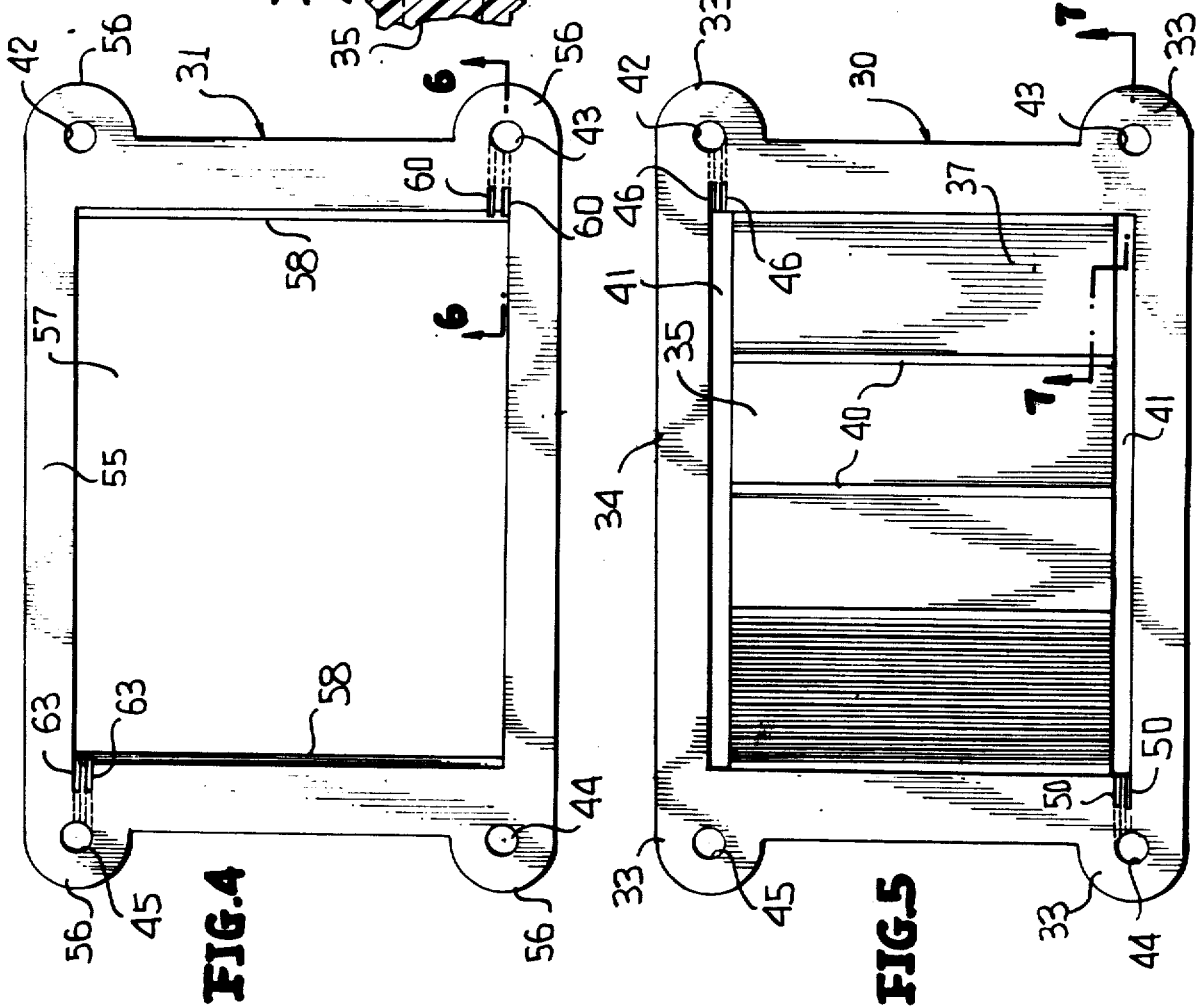
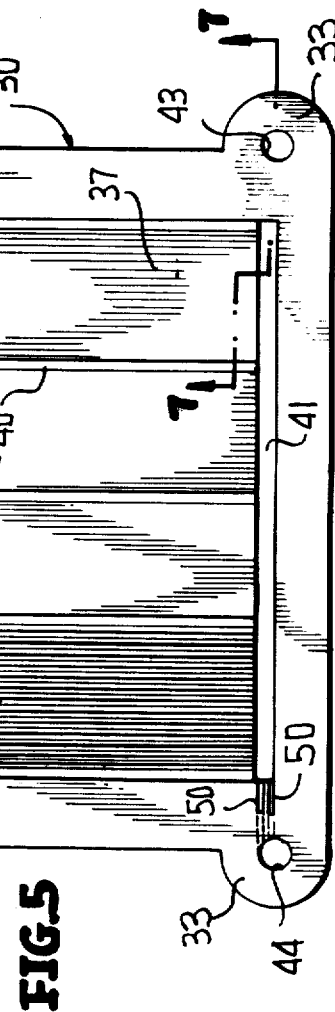

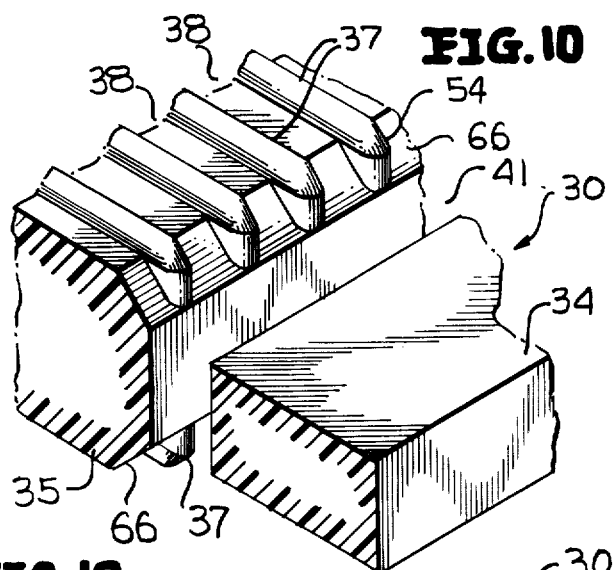
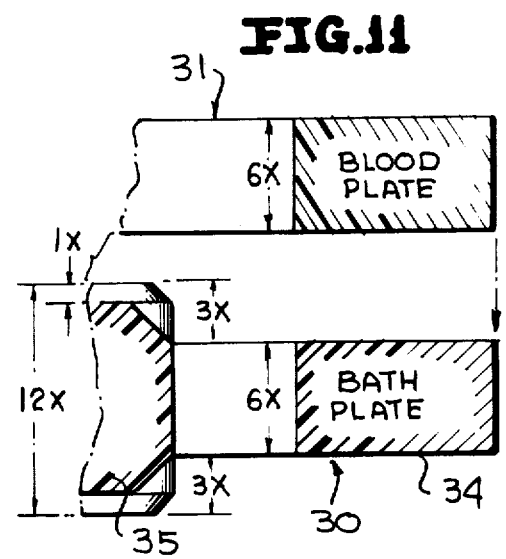
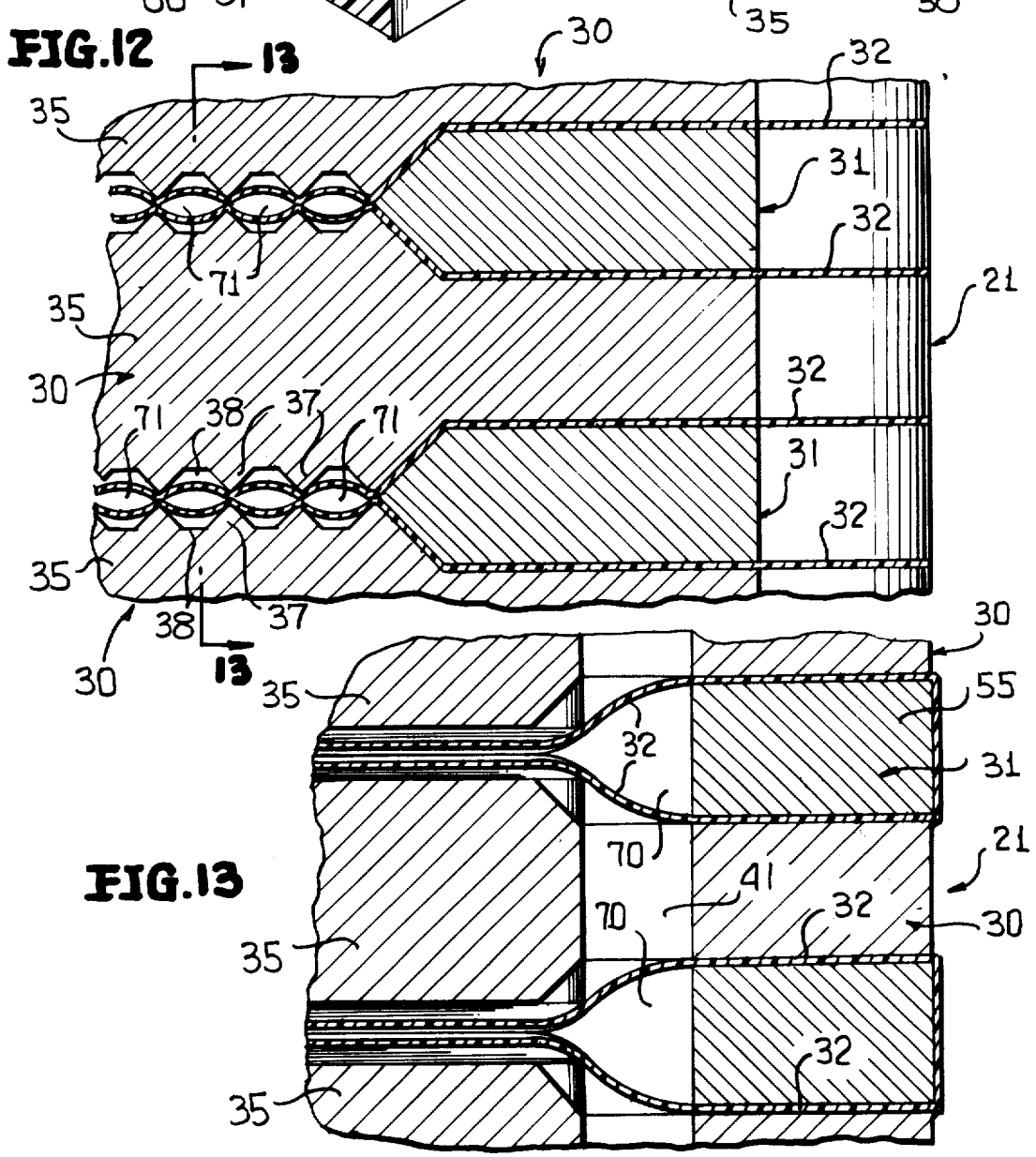

STACKED EXCHANGE DEVICE

This invention relates in general to new and useful improvements in exchange devices, and more particularly to an exchange device of the type which may be utilized as an artificial kidney.

BACKGROUND OF THE INVENTION

This invention relates to a mass transfer device suitable for dialyzing blood when using Cellulose membranes or other water permeable membranes of numerous types, such as Collagen, Acrylonitrile, Modified Lexan, Cellulose Acetate and any other water permeable membranes through which dialysis and osmosis can occur. The invention also can be used as an artificial lung when used with oxygen and carbon dioxide permeable membranes or as a heat exchanger. The invention relates to a new improved transfer device of maximum efficiency having a construction which produces uniform distribution and minimizes the thickness of blood layers. The construction insures uniform distribution and maximum speed of blood and any given total flow of gas on the one hand when used as an oxygenator, or dialysis bath when used as a dialyzer, or heat transfer medium when used as a heat exchanger, so as to optimize the transfer efficiency of any membrane used in this exchange device.

The device uses a highly sophisticated manifolding system that reduces the dead space in manifolds to an absolute minimum and maximizes the uniformity of flow distribution throughout the entire device so that essentially all areas of the membrane are covered by uniformly thin fluid films flowing at uniform rates throughout on both sides of the membrane.

At the present time, dialyzers are being used extensively for the maintenance of life in patients who have terminal kidney failure, and as more efficient dialyzers have been developed, it has become readily apparent to patients and physicians that dialyzers having the maximum mass transfer, the least priming volume and the least tendency to hemolize blood and which dialyzers can be provided as one-use disposable low-cost modules, are the most popular instruments for clinical use. The most efficient dialyzers will therefore produce a greater cleansing action of the patient's blood per unit time of treatment. The current endeavor, is to restore all possible patients with kidney failure to productive life and to allow a return to their usual occupations, and therefore instruments of the highest efficiency are the most desirable in that they will optimize and shorten the required time of treatment and insure that blood cleansing is accomplished at the maximum attainable rate. It is also found to be desirable in the use of these instruments to keep their flow resistance as low as possible so that no blood pumps need be employed. When used in this manner, the patient's arterial blood pressure has been found to be high enough to propel a rapidly flowing bloodstream through the kidney, through the bubble trap and return to the patient's venous system without the need to employ a pump. A pumpless dialyzer reduces the risks to the patient, since if any line becomes kinked during use, flow stops momentarily and the kink can be readily removed without any overwhelming potentially rupturing pressure being developed by a continuously operating blood pump. In addition, pumps are known to hemolize blood and any artificial kidney design that eliminates the pump will deliver a therapeutic mode to the patient far more suitable than one which employs a pump, since blood damage will be avoided and the patient's hematocrit or percentage of blood occupied by red cells will be higher and the patient will feel stronger and more vigorous between treatments. It has therefore been found highly desirable to develop such artificial kidneys or artificial lungs that require only the patient's arterial pressure alone and which do not require a blood pump. The present invention has been designed with this in mind and does not require a pump. On the other hand, if a patient's blood pressure is found to be extremely low, it may be found necessary to use a blood pump and for this purpose, it has been found necessary (because some patients and some physicians will sometimes persist in using a blood pump) to produce a kidney structure which is virtually immune to rupture by overpressure. This is accomplished by keeping the membrane support structure very uniform and (remembering that a chain is only as strong as its weakest link) by keeping all unsupported membrane spans of uniformly small dimensions. It has been found, for example, that a groove spacing of 0.76mm. has been found to be optimum and a groove depth of 0.25mm. optimum in this regard. Previous designs have been made of alternating blood plates and fluid grid plates alternating with membranes. This provides passageways for blood on one side of the membrane and dialysis fluid on the opposite side of the membrane, part of the blood layer being continuously in contact with the supporting blood plate plastic. While no deliterious effects have been known to occur from contact of blood with medically approved plastics in this manner, it is believed advantageous to modify my previous designs so that flowing blood can be introduced between two membranes passing between two grid plates carrying dialysis fluid in a direction countercurrent to blood flow. This invention relates to an improved plate mass transfer device in which thin layers of blood (or other fluid to be dialyzed, oxygenated or changed in temperature) are caused to flow through passageways formed by an interaction of the physical characteristics of the membrane used, hydraulic pressure and the ridged support geometry so as to produce the thinnest possible blood layers contained between the membranes consistent with pressure-flow requirements. The exchange solution (or gas) is caused to flow in a countercurrent direction on the opposite side of the membrane in the grooved channels to result in the maximum possible dialytic or oxygen transfer with a minimum amount of obligatory ultrafiltration. Some currently used artificial kidneys have a high resistance to blood flow resulting in a high average transmembrane pressure during dialysis. This results in forcing an ultrafiltrate of plasma through the membrane into the dialysis bath where it is lost thus reducing the weight of the patient. In cases where patients are over hydrated, this characteristic of the artificial kidney may be helpful and necessary to remove required amounts of fluid. However, if patients starting on dialysis are already dry, this characteristic of an artificial kidney is deliterious and it is therefore of the utmost importance to produce kidney designs that have low flow resistance and in which the transmembrane pressure within the kidney can be kept at very low values to avoid ultrafiltration and also which have such excellent membrane support that high transmembrane pressures can be developed by throttling down the outflow tubing of such kidneys (with a gradually tapered non-turbulent means) so as to provide within the kidney the transmembrane pressure required to produce the desired amount of ultrafiltration only when needed. A satisfactory transmembrane pressure can be produced by operating the dialysis bath in an artificial kidney at a negative pressure by using a suction pump. If it is desired to produce pressure on the blood side to produce the transmembrane pressure, it may be necessary in that case to convert a pumpless dialyzer to a pumped dialyzer to produce the necessary pressure by using a peristaltic pump. This kidney when used, however, with a negative pressure dialystate delivery system can be still operated in the pumpless mode when being used as an ultrafilter. Artificial kidney designs must be produced with the lowest priming volume per unit membrane area since patients cannot tolerate being connected to artificial kidney systems in which an amount of blood greater than 10% of their blood volume is used to prime the equipment. This is particularly important when babies must be dialyzed or young children. The characteristics of currently used artificial kidneys have greatly inhibited the development of pediatric nephrology and it is one of the purposes of this invention to allow an artificial kidney which can be used safely not only with adults, but with babies and small children. It is, therefore, highly desirable for paitents who are sick and in a brittle condition to provide an artificial kidney system having the least possible priming volume. Placing the patient on dialysis, therefore, will produce the least possible hemodynamic change. In some instances where the decision to dialyze or not to dialyze may mean the difference between life and death, the dialyzer capable of producing the least possible systemic effect may allow dialysis, whereas other types of dialyzers may be contraindicated because of their danger and the patient may therefore succumb to his disease. This dialyzer has, therefore, been designed for the lowest possible priming volume and the manifolding has been optimized fully to the extent that the least possible area of manifolding and volume of manifolding is employed. By employing closely spaced membrane supporting structure, the change of priming volume with change of pressure (compliance) within the kidney has also been minimized to reduce the shift of blood from patient to dialyzer as the kidney is pressurized for ultrafiltration and then later on depressurized as the need for ultrafiltration is abolished. This shift in blood from patient to kidney, as the membrane is pressurized and ballooned into the supporting channels, is termed compliance. Some kidneys have compliances as high as 100 cc of blood per 100 mm. of mercury pressure, whereas this kidney has a compliance of only 10cc to 15cc per 100 mm. of mercury pressure. The patient will, therefore, not have a significant shift of his circulating blood volume to the kidney system if ultrafiltration to remove fluid from the patient is found to be desirable. The blood passageways in the DIAMAX have all been designed so that turbulence is eliminated and flow is laminar throughout. The kidney is essentially rupture proof because of the fine uniformly spaced supporting structure. Maintaining the uniformity of dimensions in artificial kidneys is very essential to maintain the uniformity of blood flow and dialysate flow or gas flow for artificial lungs. This has been quite difficult for designers because injection molded plates are usually semi-ridged rather than being ridged and therefore many methods have been used to control dimensions. One method is to make the dialysate groove plates massive in thickness so that dimensional changes will be minimized. This is obviously impractical for constructing compact light weight disposable possibly wearable dialyzers. The applicant originated a method in 1965 in which the grooved plates were grooved in a sine wave fashion 180° out of phase. The plates could therefore be pressed together tightly stabilizing the dimensions and could still be amde of very lightweight disposable materials. This was described in applicant's U.S. Pat. No. 3,490,523. It has also been found by applicant that slanting the grooves have the same effect and this was covered previously in applicant's U.S. Pat. No. 3,695,445. However, the first invention did not allow a compact design and was proposed as a large flat plate disposable unit and the second method described in U.S. Pat. No. 3,695,445 also has the disadvantage that blood is exposed to the membrane on one side and to the plastic supporting plate on the other. It has been found that if the plates are modified slightly to allow them to be grooved in a semi-circular arced fashion, in opposite directions on opposing plates, that the plates can be prevented from nesting and can be made thin and light weight and the assembly can be tightly pressed together to produce blood and fluid pathways that are precise in their geometric dimensions and therefore allow for perfectly uniform blood and fluid or gas flow.

SUMMARY OF THE INVENTION

In the accomplishment of the objectives of this invention, it has been found desirable to provide a molded plate dialyzer which can be formed of either pre-cut sheets of membrane which can be stacked alternating with injection molded fluid and blood plates or a device that is designed for mass production, allowing assembly from a continuous roll of membrane in a pleated fashion as will be hereafter described.

In accordance with this invention, it is proposed to provide an exchange device wherein plates thereof include a frame and a central core with the central core having formed in opposite faces thereof flow passages, and the plates being arranged with the cores thereof being substantially disposed in opposition to one another and with there being a pair of transfer films disposed therebetween, and there being means for supplying a fluid to be treated between the transfer films and treating fluid between each core face and an adjacent transfer film wherein exchange fluids are directed on opposite sides of the fluid to be treated flowing between the two films.

In accordance with this invention, the cores are of a greater thickness than the frames and between each pair of plates there is a second plate having a hollow center generally matching the cores of the first mentioned plates with the second plates separating the frames of the first mentioned plates and forming in conjunction therewith means for clamping and sealing edges of the transfer films.

It has been found that the more desirable transfer films, such as cuprophan membranes, are asymmetric. The molecules in these films are lined up in the longitudinal direction because the membranes are stretched during processing. When the membranes are wet and pulled in the longitudinal direction, they elongate very little, but when they are pulled in a transverse direction, they elongate quite a bit. For example, a membrane may have a 10% elongation in the transverse direction.

By positioning the transfer films so that their transverse direction extends transversely of the flow passages, when the transfer films are wetted, they will elongate in a transverse direction and thereby automatically assume the limp necessary "stretched" relationship to provide the flow passages between adjacent films, without need for distention by pressure.

With the above and other objects in view that will hereinafter appear, the nature of the invention will be more clearly understood by reference to the following detailed description, the appended claims and the several views illustrated in the accompanying drawings.

IN THE DRAWINGS

FIG. 4 is a plan view of one of the plates and shows the general outline thereof.

FIG. 5 is a plan view of the other of the plates and shows the general outline thereof.

FIG. 6 is an enlarged fragmentary vertical sectional view taken along the line 6—6 of FIG. 4 and shows the details of the flow means thereof.

FIG. 7 is an enlarged fragmentary vertical sectional view taken along the line 7—7 of FIG. 5 and shows the specific details of the flow means of the plate.

FIG. 8 is a fragmentary sectional view taken along the line 8—8 of FIG. 6 and shows further the details of the plate of FIG. 4.

FIG. 9 is a fragmentary sectional view taken along the line 9—9 of FIG. 7 and shows further the details of the plate of FIG. 5.

FIG. 10 is an enlarged fragmentary perspective view of an intermediate portion of the plate of FIG. 5 and shows the specific details of the flow passages thereof.

FIG. 11 is an enlarged exploded sectional view showing the relative thicknesses of the various portions of the two plates.

FIG. 12 is an enlarged fragmentary sectional view taken along the line 12—12 of FIG. 2 and shows the relationship of the plates along one edge of the stack.

FIG. 13 is an enlarged fragmentary sectional view taken along the line 13—13 of FIG. 12 and shows the details of the plates along an adjacent edge of the stack.

Figure 1:
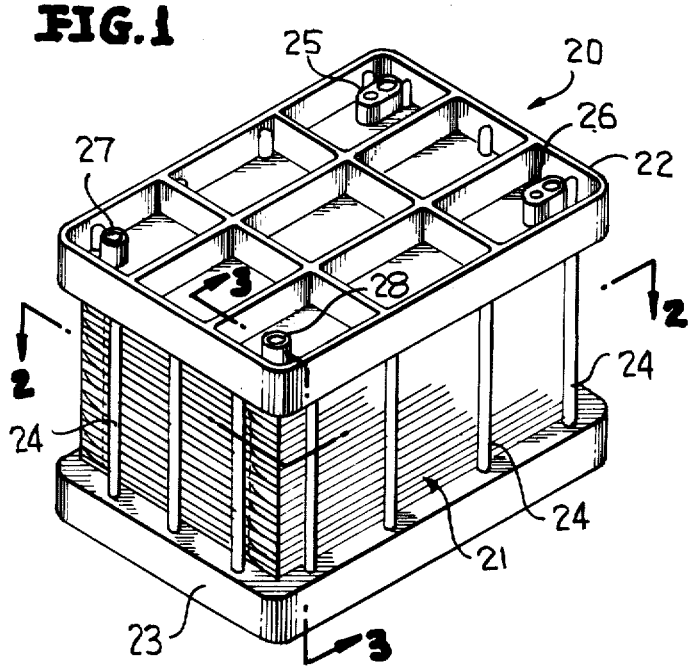
FIG. 1 is a perspective view of a transfer device forming in accordance with this invention.
Figure 3:
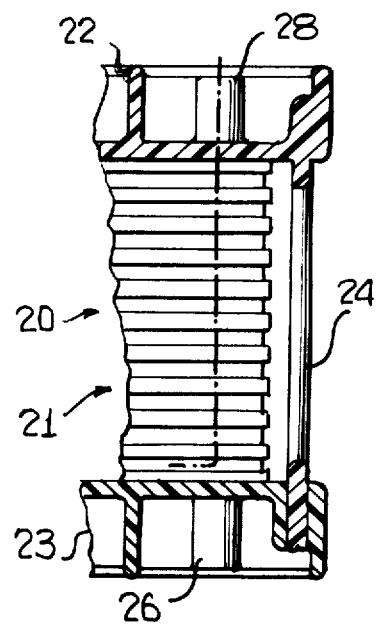
FIG. 3 is an enlarged fragmentary vertical sectional view taken along the line 3—3 of FIG. 1 and shows further the details of the transfer device.

Referring now to the drawings in detail, it will be seen that there is illustrated in FIG. 1 the over-all exchange device which is generally identified by the numeral 20. The exchange device 20 generally includes a stack 21 of flow plates which are clamped between headers 22 and 23. The headers 22, 23 are generally clamped together by suitable fasteners 24, extending therebetween.

The headers 22, 23 may be of identical constructions and each header is provided with a pair of fittings 25, 26 to which fluid inlet or return lines (not shown) may be attached. Each of the headers 22, 23 is also provided with fittings 27 and 28 which are aligned with the fittings 25, 26, respectively of the opposite header. Each of the fittings 27, 28 defines a bore which may be utilized as a receptacle and guide for a punch (not shown) for forming fluid passages in transfer films of membranes in a manner to be described hereinafter. It is to be understood after the fluid passages are formed, the fittings 27, 28 will be suitably plugged.

With reference to FIGS. 12 and 13, it will be seen that the stack 21 includes a plurality of first flow plates 30 which are arranged in alternating relation with second flow plates 31. Between each flow plate 30 and an associated flow plate 31 there is a transfer film or membrane 32.

Figure 2:
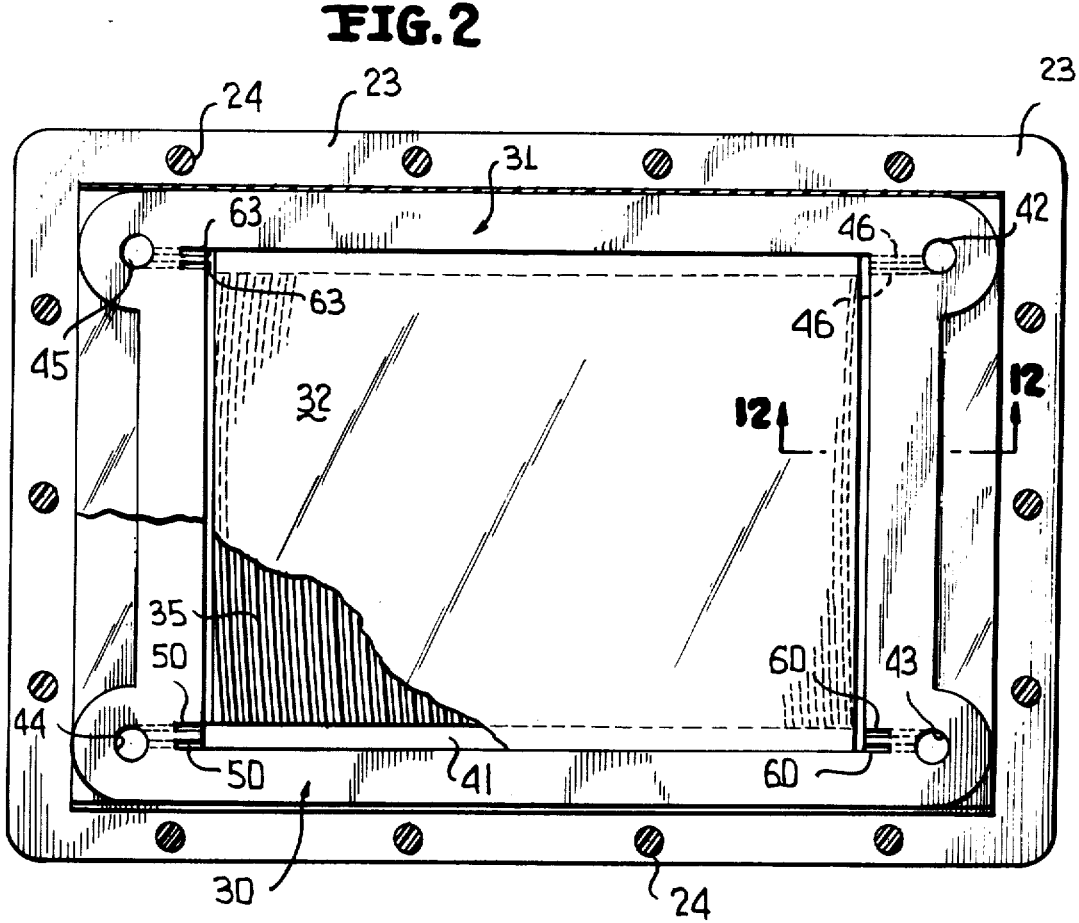
FIG. 2 is an enlarged horizontal sectional view taken along the line 202 of FIG. 1 and shows the details of the transfer device.

Referring now to FIGS. 5, 7 and 9, it will be seen that each first flow plate 30 is generally rectangular in outline and is provided at the corners thereof with extensions 33. Each flow plate 30 has a generally rectangular frame 34 and a central core 35. As is shown in FIGS. 7 and 9, the frame 34 has planar opposite faces whereas the central core 35 is provided with a plurality of longitudinally extending ribs 37 which define therebetween longitudinally extending flow passages 38. ribs and flow passages are arcuate, as shown in FIG. 2 with the ribs 37 of adjacent flow plates 30 being in crossing relation to prevent internesting.

It is also to be noted that the ribs may extend in a straight line longitudinally of the core 35, as shown in FIG. 5. In such case, in order to prevent the cores of adjacent flow plates 30 from internesting at spaced intervals, there are relatively wide flat ribs 40 which are engageable with like ribs of an adjacent flow plate 30 to prevent internesting.

Also, it is to be noted that at the longitudinal ends of the core 35, the core is spaced from the frame 34 to provide a pair of transversely extending slots 41 which extend entirely through the flow plate 30, as is clearly shown in FIG. 9. It is to be understood that the slots 41 in each plate 30 define a distribution channel and a return channel.

Each of the corners 33 of each flow plate 30 has a circular passage therethrough. As shown in FIG. 5, these passages include a first fluid supply passage 42, a second fluid supply passage 43, a first fluid return passage 44 and a second fluid return passage 45.

In order that fluid may pass from the supply passage 42 into the adjacent slot 41, there is formed in the plate 30 starting on the underside of the plate, starting at the 054to the  ,
upper surface of the plate 30 and into the slot 41.

As is clearly shown in FIG. 7, each passage 46 makes a smooth transition between its respective supply passage 42 and the associated slot 41 and produce laminar and non-turbulent flow. As a result, the particular configuration of each passage 46 produces less blood damage in general and at the same time there will be a lower pressure drop in the fluid travelling through the groove. It is pointed out here that as soon as one has turbulence in a situation such as the flow described here, the pressure drop is elevated. It will, therefore, be apparent that a major beneficial effect can be obtained with the particular passage configuration.

In a like manner, a first fluid flows from the opposite slot 41 into the return passage 44 through a pair of passages 50 starting on the upper surface of the plate 30 and extending through the plate 30 to the underside thereof and into the return passage 44.

Referring now to FIG. 7, it will be seen that the thickness of the core 35 is substantially twice the thickness of the frame 34. Further, it will be seen that the frame 34 is disposed in centered relation with respect to the core 35 in a thickness direction. Finally, it is to be noted that the longitudinally extending edges of the core 35 are bevelled as at 53 from the faces of the core 35 to the frame 34.

In FIG. 9 it will be seen that the transverse edges of the core 35 are also bevelled as at 54. However, this bevelling is only for the height of the ribs 37.

Referring now to FIGS. 4, 6 and 8, it will be seen that there are illustrated the details of one of the second plates 31. Like the plate 30, the plate 31 includes a generally rectangular frame 55 having rounded corner extensions 56. However, instead of having a core like the core 35, the flow plate 31 has an open center 57 which generally matches the core 35 but which is of a longitudinal dimension to extend to the longitudinally outer edges of the slots 41. The longitudinal inner edges of the frame 55 are bevelled as at 58 to cooperate with the bevels 53 of the plates 30 in a manner to be described hereinafter.

The corner projections 56 have formed therein the flow passages 42, 43, 44 and 45 previously described with respect to the first plate 30. Means are provided for supplying the second fluid into the opening 57 at one longitudinal end thereof. These means include narrow flow passages 60 formed in the underface of the plate 31 starting at and extending inwardly from the flow passage 43. The passages 60 open through the upper face of the plate 31 and extend into the opening 57.

The second fluid passes out of the opening 57 into the second fluid return passage 45 through a pair of fluid passages 63 formed in the upper face of the plate 31 and extending to the underside of the plate 51 and into the return passage 45.

Reference is now made to FIG. 10 wherein there are illustrated further details of the first plate 30. It is to be noted that in addition to the ends of the ribs 37 being bevelled as at 54, the longitudinal ends of the core 35 are bevelled as at 66 down to the plane of the frame 34. This is also illustrated in FIG. 9. This arrangement provides for freedom of flow of a fluid from the slot 41 into the flow passages 38 and in a like manner from the flow passages 38 into the opposite one of the slots 41.

Referring now to FIG. 11, it will be seen that there is illustrated a typical thickness relationship between the plates 30 and 31. The plate 30 has a frame 34 of a thickness 6X, for example. The thickness of the core 35 is twice the thickness of the frame 34 or 12X. The core 35 extends above and below the frame 34 a distance of 3X. The height of each of the ribs 37 is 1X.

Inasmuch as the thickness of the frame 34 and the thickness of the second plate 31 combined must equal the thickness of the core 35, it will be seen that the thickness of the plate 31 is also 6X in the illustrated example.

Referring now to FIGS. 12 and 13, it is to be understood that the plates 30 and 31 are assembled in the stack 21 in alternating relation and that the transfer films or membranes 32 are preferably provided as a continuously pleated membrane, as is best shown in FIG. 13, although it may be formed as a plurality of individual films. A membrane or film layer extends between each of the adjacent plates 30 31 as is clearly shown in FIG. 12. Further, the longitudinal extent of the membrane extends longitudinally of the flow passages 38 for a reason to be described hereinafter.

It is to be noted, however, that the membrane or film layers within each type 31 opening are in opposed relation and generally clamp together at intervals between the opposing ribs 37.

The fluid to be treated flows into each plate 31 opening 57 through the fluid passage 43 between the two films 32 which pass around the frame 55 thereof into a transversely extending space 70. This fluid, in the case of an artificial kidney being blood, is then distributed so as to flow longitudinally between the opposed film layers with the film layers being deformed, as is shown in FIG. 12 between adjacent ribs into the flow passages 38, partially closing the flow passages 38. The so-formed flow passages between the films 32 are identified by the numeral 71.

The treating fluid flows through the supply passage 42 into the respective slot 41 and then longitudinally of the core 35 on opposite faces thereof in the flow passages 37. Thus, the treatment fluid is available for association with the fluid being treated through the films or membranes 32 so as to provide for the desired transfer. It is to be noted that the arrangement of the supply passages 42 and 43 is such that flow in the flow passages 38 is opposite to that in the passages 71 so that a maximum transfer may be effected.

At this time it is pointed out that the pressure of the fluid being treated (blood) is greater than that of the treatment fluid so that the illustrated relationship of the flow passages 38 and 71 in FIG. 12 is a correct illustration.

It is to be noted that the films or membranes 32 are tightly clamped between the frames 34 and 55 around the periphery of the plates 30, 31 so that no further sealant is required. The frames of the plates 30, 31 provide adequate flat clamping surfaces of sufficient extent for the necessary seal for the relatively light pressures of the fluids flowing within the plates.

At this time it is pointed out that many of the transfer films or membranes are asymmetric. The molecules thereof are lined up in the longitudinal direction because the membrane is stretched during processing. When the membrane is wet and pulled in the long direction, it elongates very little. However, when the membrane is pulled in a transverse direction, while wet, it will elongate a considerable amount. For example, Cuprophan membrane, is asymmetric and elongates in a transverse direction on the order of 10% when wet.

With particular reference to FIG. 12, it is to be understood that when the membrane or film 32 is clamped between the plates 30, 31, that portion thereof between the adjacent cores 35 is substantially planar. However, when it is wetted by the two fluids introduced into the exchange device, it has a tendency to elongate transversely of the flow passages 38 and therefore, very little, if any pressure is required to distort the film or membrane 32 in the manner illustrated in FIG. 12. It has been found in the case of Cuprophan membrane, when it is properly oriented, in a preselected stack 21 blood flow at the rate of 500 ml/min may be obtained with a pressure on the order of 60 mm of Hg. On the other hand, if the Cuprophan membrane is applied in the transverse direction, the membrane substantially resists distortion so that very high pressures are required. In fact, if the membrane is disposed with the molecule orientation diagonally with respect to the flow passages, it has been found for a 500 ml/min. blood flow with a like stack, a pressure of 280 mm of Hg. is required. This means that a pump is absolutely mandatory. Further, in the cases of incorrectly oriented membranes, it is to be understood that fluid flow will be through the path of least resistance so that only certain of the membranes will be effective. That is, if the membranes are individually applied, and some are misoriented, those which are misoriented would not function or if they functioned, they function to only a minute degree. Therefore, it has been found that orientation of the membrane with respect to the flow passages of the plates is essential.

Although only several preferred embodiments of the invention have been specifically illustrated and described herein, it is to be understood that further minor variations may be made in the transfer device without departing from the spirit and scope of the invention as defined by the appended claims.

I claim:

1. An exchange device comprising a plurality of first and second plates arranged in alternating relation, each of said plates including a frame, transfer films extending between said frames in sealed relation thereto, each first plate having a central core of greater thickness than its respective frame, flow passages formed in opposite faces of each central core, each second plate being open within the frame thereof with cores of adjacent first plates projecting thereinto, first flow means for introducing a first fluid between each core face and an adjacent transfer film for flow through the flow passages thereof, and second flow means for introducing a second fluid between two adjacent ones of said transfer films disposed between two adjacent ones of said cores, the thickness of each core being substantially equal to the combined thickness of the frames of a first plate and a second plate.

2. The device of claim 1 wherein said first flow means includes an elongated passage at each of two opposite sides of each core partially separating each core from its respective frame, said elongated passages extending transversely of said flow passages in communication therewith.

3. The device of claim 2 wherein each first plate frame has a supply passage and a return passage disposed in opposite corners thereof with each being in communication with one of said elongated passages.

4. The device of claim 2 wherein edges of each core are generally bevelled facing said elongated passages for facilitating fluid flow between said flow passages and said elongated passages.

5. The device of claim 4 wherein said flow passages are defined by upstanding ribs, said ribs projecting to said elongated passages and overlapping said bevels.

6. The device of claim 5 wherein said ribs have rounded ends facilitating fluid flow into said flow passages.

7. The device of claim 5 wherein a majority of said ribs are V-shaped in cross section, and spaced ones of said ribs have flat faces for matching opposed relation to prevent nesting of said ribs and distortion of said flow passages.

8. The exchange device of claim 5 wherein said ribs are arched with ribs of adjacent first plates being arched in opposite directions and thus in crossing nesting preventing relation.

9. The device of claim 1 wherein each said second plate frame is spaced from cores nested therein at the ends of said flow passages formed therein to form remote elongated passages for supplying and returning a second fluid.

10. The device of claim 9 wherein each second plate frame has a supply passage and a return passage disposed in opposite corners thereof with each being in communication with one of said elongated passages.

11. The device of claim 1 wherein two opposite side edges of each core are bevelled, and like inner edges of each second plate frame has a like bevel with said like inner edges being nested between a pair of said cores.

12. The device of claim 1 wherein said transfer films comprise a single continuous pleated length of film.

13. The device of claim 1 wherein said flow passages are defined by a plurality of ribs formed in projecting relation on said cores, a majority of said ribs are V-shaped in cross section, and spaced ones of said ribs have flat faces for matching opposed relation to prevent nesting of said ribs and distortion of said flow passages.

14. The device of claim 1 wherein said second flow means direct into said exchange device a second fluid at a higher pressure than that of a first fluid wherein said transfer films are deformed apart partially into said flow passages to define other flow passages between said transfer films.

15. The exchange device of claim 1 wherein said transfer film is asymmetric and has greater transverse elongation when wet than longitudinal, and each transfer film has its transverse direction extending transversely of said flow passages for automatic elongation when wetted and general conformation to said flow passages.

16. The device of claim 1 wherein said first and second flow means each includes an internal flow passage, a through flow passage, and a transverse passage communicating said internal flow passage and said through flow passage, said transverse passage extending through the respective one of said plates as a smooth reversing curve.

17. For use in the formation of an exchange device, first and second plates, said plates having matching frames, said first plate having a core within its frame of a greater thickness than said first plate frame, and second plate being open within said frame thereof for the reception of said core, the thickness of said core being equal to the combined thickness of said frames, and said core has flow passages in opposite faces thereof.

18. The plates of claim 17 wherein said core is separated from said frame by longitudinal passages at the ends of said flow passages in communication with said flow passages.

* * * * *